Patented June 3, 1924.

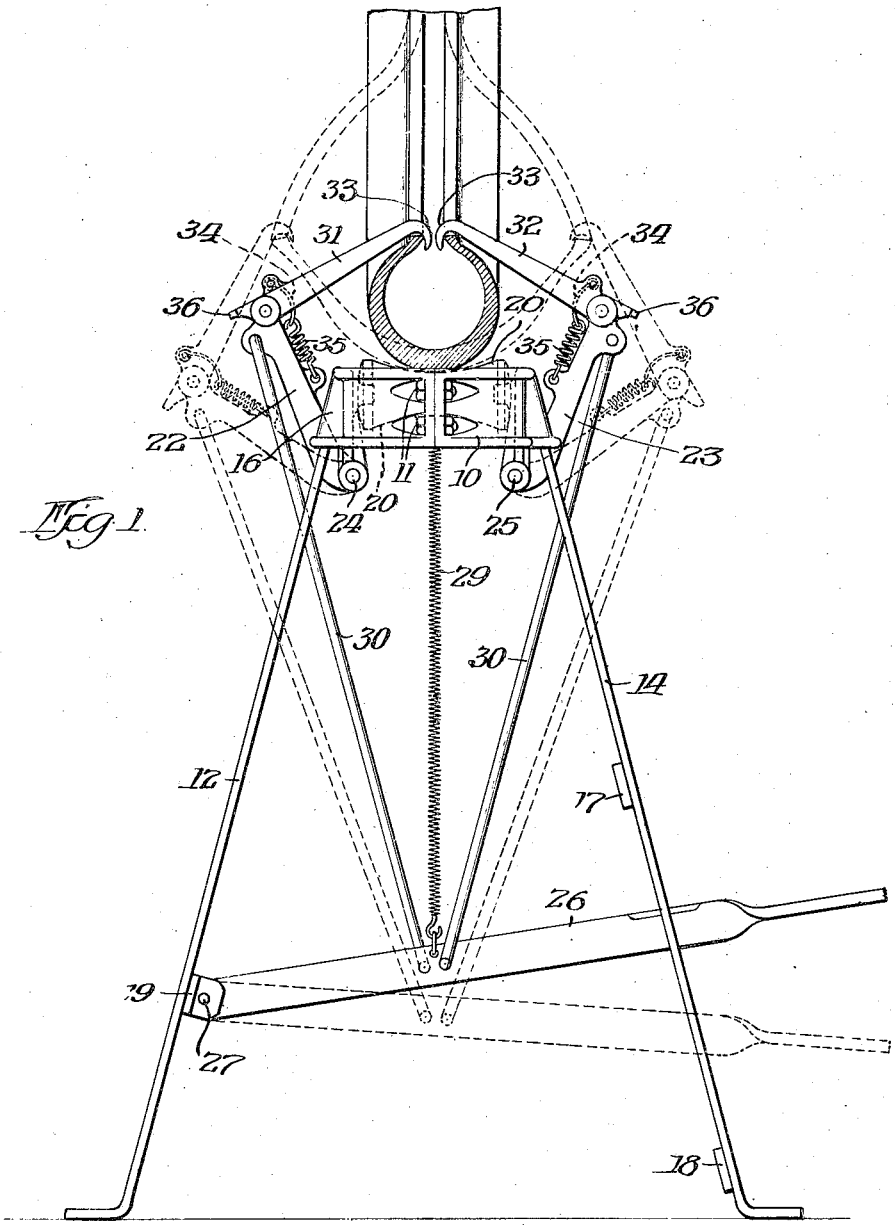
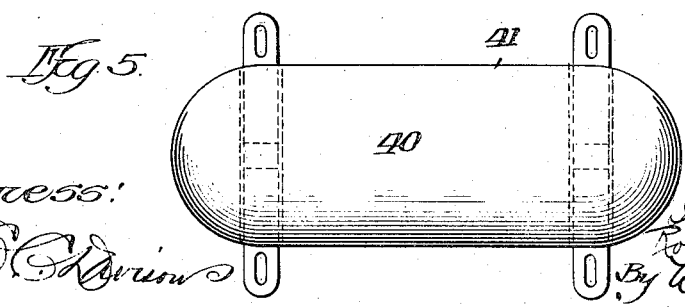

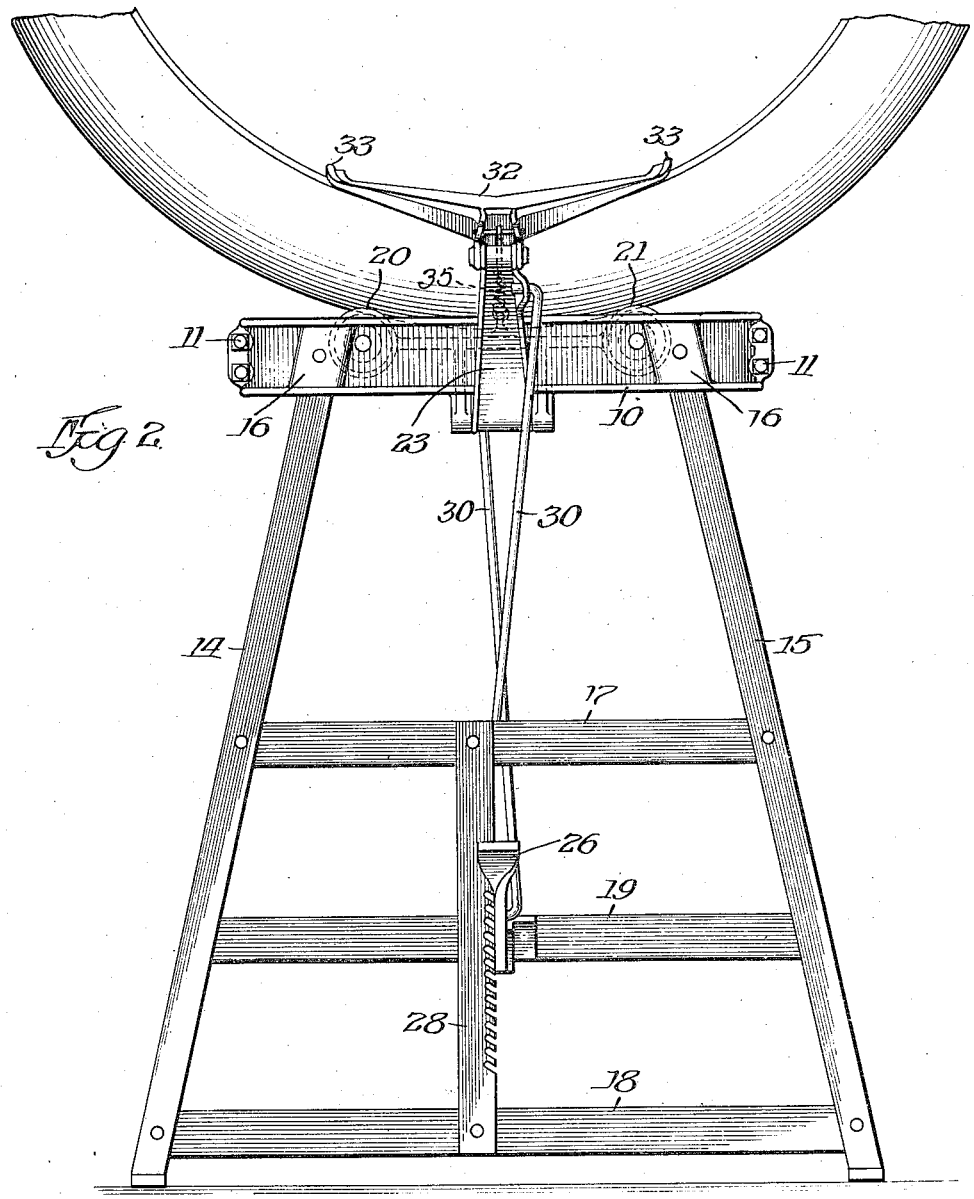

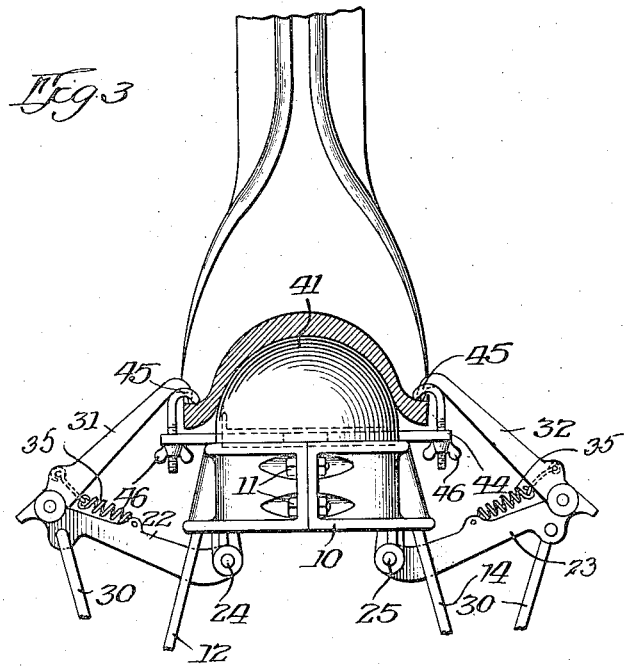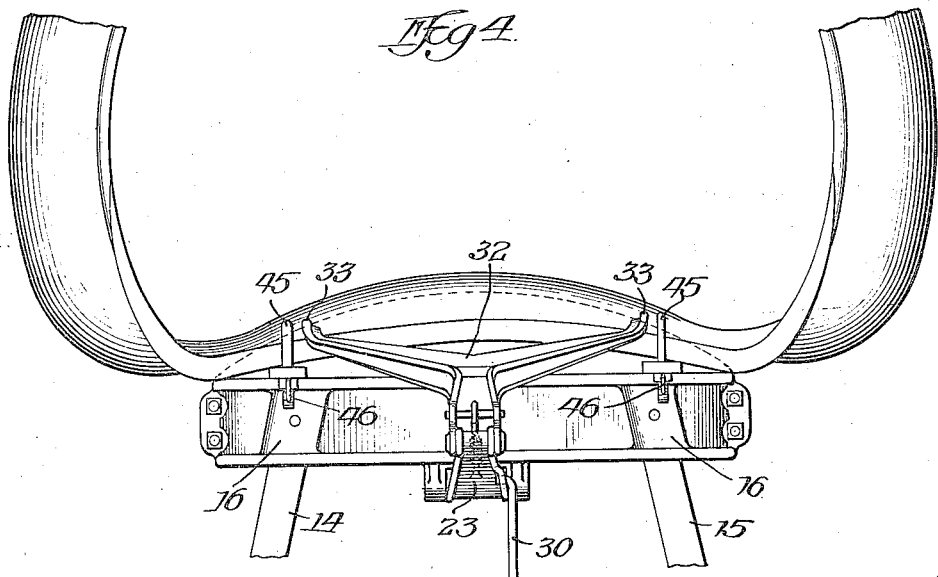

1,496,191

UNITED STATES PATENT OFFICE.

IRA A. WEAVER AND ROLLA G. STOEHR, OF SPRINGFIELD, ILLINOIS, ASSIGNORS TO THE WEAVER MANUFACTURING COMPANY, OF SPRINGFIELD, ILLINOIS, A CORPORATION OF ILLINOIS.

PNEUMATIC-TIRE-CASING SPREADER.

Application filed October 17, 1917. Serial No. 197,072.

*To all whom it may concern:*

Be it known that we, IRA A. WEAVER and ROLLA G. STOEHR, both citizens of the United States, residing at Springfield, in the county of Sangamon and State of Illinois, have invented certain new and useful Improvements in Pneumatic-Tire-Casing Spreaders, of which the following is a specification.

Our invention pertains to improved and novel means for facilitating the inspection and repair of pneumatic tire casings or shoes and similar structures. After a casing has been punctured or otherwise damaged, it is desirable to examine its inner surface to determine the cause of the injury, to effect its removal if still present, and in some cases, to repair or reinforce the fabric of the casing by the application of a patch to its inner surface. The accomplishment of this work is aided by the use of one of these appliances, which is adapted to successively spread or open up the various portions of the casing for inspection and turn a part of it inside out if a patch or similar repair work is required.

One of the salient features of the invention is the provision of a structure of this general character which shall be simple in construction, economical to manufacture, effective in results, and easy to operate. The manner in which these and other desirable objects are attained will be readily understood by those skilled in the art from a consideration of a preferred embodiment of the invention described in detail below and illustrated in the accompanying drawings forming a part of this specification, and throughout the various views of which like reference characters refer to the same parts.

In the drawings:

Figure 1 is an end elevation of the mechanism, the tire casing being shown in section;

Figure 2 is a front view of the same;

Figures 3 and 4 are fragmentary views similar to Figures 1 and 2 showing a part of the casing turned inside out and clamped to a removable form block;

Figure 5 is a plan view of such form block; and

Figure 6 is a cross-section through the same.

Referring first to the appliance of Figures 1 and 2, it will be observed that the device incorporates a cast-metal frame 10 comprising two parts or halves bolted together at 11, 11, and supported on suitable legs 12, 13, (not shown), 14, and 15, the lower ends of which have flat feet adapted to rest on the floor, and the upper ends of which are received and fastened in sockets 16 cast integral with the companion frame members, these legs being connected together and braced by the horizontal bars 17, 18, and 19.

In order to support the tire casing in a proper manner and at the same time permit its position to be readily shifted for the spreading or flattening of a new part, the frame 10 has revolubly mounted in it a pair of spaced concave rollers 20 and 21, shaped to conform in a general way to the form of the casing when opened up.

The spreading means comprises two opposite levers 22 and 23 fulcrumed on the lower part of the frame at 24 and 25 on depending supports forming integral parts of the frame. Such oppositely-disposed levers are adapted to be swung downwardly and outwardly on their fulcrums by a treadle or pedal-lever 26 hinged or fulcrumed at 27 on a bracket on the bar 19 and extending between the legs 14 and 15 and in juxtaposition to a fixed upright notched or ratchet bar 28 mounted on the horizontal bars 17 and 18. Such pedal or foot lever is normally lifted or raised by a coil contractile spring 29, but the lever may be maintained depressed in any one of a variety of positions by co-operation with the notches or teeth of bar 28. The foot lever is operatively connected by two links 30, 30, with the outer ends of the swinging arms 22 and 23 each of which has a bifurcated or Y-shaped double-hook arm 31 and 32, respectively, pivoted thereto at its upper end and carrying at its free end two spaced hooks or jaws 33, 33, adapted to engage or hook over the edge of a tire casing resting on the supporting curved rollers 20 and 21.

Each of these arms or jaws 31 and 32 is connected by a curved link or loop 34 and a coil spring 35 to its supporting and actuating lever 22 and 23, as the case may be, each arm being permitted to swing to either side of its pivot pin and retained in such position by its spring, but being limited in its opening movement by a lateral lug or finger 36 adapted to strike the lever 22 or 23. In other words, each hook-equipped arm may swing beyond dead center on its supporting lever, either outwardly into inoperative position or inwardly into casing-engaging position, and it will be yieldingly held in either position by its spring which swings to either side of the pivot.

The appliance is operated as follows:

Assuming that it is desired to inspect or examine the inner surface of a tire casing, which, as is well known, is rather stiff and clumsy to handle, the hooks having been swung outwardly by hand to separated or expanded condition, in which relation they are automatically held by their springs 35 passing dead center and maintaining their stops 36 against the arms 22 and 23, the casing is placed in an upright position on the rollers 20 and 21, whereupon the hook arms are swung or sprung over into the relation shown in Figure 1, with their hooks or jaws engaging the opposite adjacent edges of the casing. Then the operator steps on the pedal and holds it depressed by causing it to co-operate with one of the teeth of the locking ratchet-bar. This movement of the pedal compels the hooks to move outwardly and downwardly, always maintaining their hold on the casing edges, by reason of their freedom of movement and the action of their springs, and spreading it or opening it up, as shown in dotted lines in Figure 1, under which circumstances its inner surface may be examined with facility and dispatch. Then the pedal is released, it rises automatically, the hooks approach each other, and the casing contracts. Now the operator rolls or turns the casing somewhat on its own axis, and while resting on the rollers, bringing a new section into the field of operation of the hooks which temporarily open up such part, and the action is progressively continued until the inspection of the entire casing is consummated. In this way the casing can be fully inspected as to the nature and cause of the injury and for the determination of weak parts or areas.

If it becomes necessary to repair a hole in the casing, as by applying a patch on its inner surface, it is desirable to turn such portion of the casing inside out and maintain it temporarily in that relation, thus permitting the surface to be cleaned by hand or on a buffing machine and while applying the cement and fitting the patch.

To accomplish this advantageous result, the device is provided with an auxiliary or supplemental removable or detachable form of proper shape adapted to have the injured portion of the casing clamped to it, the form being desirably convex in shape and co-operating with the outer surface of the casing. Such a form or block is shown by itself in Figures 5 and 6 and in association with the spreading mechanism in Figures 3 and 4.

This form block 40 is hollow and has a longitudinally and transversely curved or convex upper sheet-metal wall 41 and a flat base portion 42 provided with depending ear portions 43, 43, and lateral bars 44 and 44 slidable in cavities in the base and each provided externally of the block with a threaded hook 45 and winged nut 46 by which it may be tightened and loosened.

In use, this block is placed on the frame as shown in Figures 3 and 4, the lugs 43, 43, fitting in the frame and preventing misplacement or malpositioning. Then the casing is opened up at the damaged place by the hooks 31 and 32 whereupon the clamps or catches 45 are caused to engage the edges of the casing and are tightened by their nuts. In this way such portion of the casing is turned wrong side out or inside out, as shown in Figures 3 and 4. Then the hooks 31 and 32 are released and the casing with the form block still clamped thereto may be removed from the appliance for cleaning and the application of the patch, whereupon the block is unclamped and removed.

With casings of small size the form block and its hooks alone may be used, not only for holding the casing wrong side out, but for spreading it initially and turning it inside out by merely manipulating the clamping hooks. With larger casings, however, it is preferable to take advantage of the mechanical benefits of the spreading appliance proper in association with the block.

It will be clear that the spreading device is adapted to accommodate and act upon casings of various sizes without adjustment, the hooks readily adapting themselves by reason of their peculiar mountings to casings of all ordinary sizes and shapes. Furthermore, since the clamping hooks associated with the form block are adjustable they readily lend themselves for use on casings of various dimensions.

To those skilled in this art it will be appreciated that many minor mechanical changes may be made in the appliances presented without departure from the substance of the invention and without the sacrifice of any of its substantial benefits and advantages.

We claim:

1. In an appliance of the character described, the combination of means to support a tire-casing, spreading means to open up such casing, and operating means for said spreading means including rock-arms pivoted outside of the space bounded by the tire casing at points spaced apart transversely of the casing, substantially as described.

2. In an appliance of the character described, the combination of means to support a tire casing, spreading means to engage an edge of the casing and open it up, and a spring acting on said spreading means tending to hold it either outwardly in inoperative position or inwardly in casing-engaging operative position, substantially as described.

3. In an appliance of the character described, the combination of means to support a tire casing, a lever arm, a hook pivoted on said arm and adapted to engage an edge of the casing and open it up during movement of the lever arm, means to operate said lever arm, and a spring acting on said hook to maintain it in casing-engaging relation, substantially as described.

4. In an appliance of the character described, the combination of means to support a tire casing, a lever arm, a hook pivoted to said arm and adapted to engage an edge of the casing and open it up during movement of the lever arm, means to operate said lever arm, and a spring acting on said hook and adapted to hold it in inoperative condition or in operative casing-engaging condition, substantially as described.

5. In an appliance of the character described, the combination of means to support a tire casing, a pair of lever arms outside of the space bounded by the tire-casing, a hook pivoted to each of said arms, said hooks being adapted to engage the edges of the casing and open it up during movement of the lever arms, and means to simultaneously operate said lever arms and hooks, substantially as described.

6. In an appliance of the character described, the combination of a form block, means to spread a tire casing open over said block, and means to clamp the casing in spread condition to said block, substantially as described.

7. In an appliance of the character described, the combination of a tire casing spreading device, a form block demountably associated with the spreading device and over which the latter is adapted to open up the casing, and clamping means on said block adapted to hold said casing in spread condition on the block after removal of the block and casing from the spreading device, substantially as described.

8. In an appliance of the character described, the combination of a tire casing spreading device adapted to engage the opposite edges of the casing and open it up, a form block demountably associated with said spreading device and over which the latter is adapted to open up the casing, and clamping means on said block adapted to engage the edges of the casing and hold the latter in spread condition on the block after the removal of the block and casing from the spreading device, substantially as described.

9. In an appliance of the character described, the combination of a tire casing spreading device, a form block demountably associated with said spreading device and over which the latter is adapted to open up the casing, means to prevent displacement of the block in said device, and clamping means on said block adapted to hold said casing in spread condition on the block after removal of the block and casing from the spreading device, substantially as described.

10. In an appliance of the character described, the combination of a form block and clamps mounted thereon adapted to hold a tire casing in spread condition over the block, substantially as described.

11. In an appliance of the character described, the combination of a form block and clamps mounted on and adjustable relatively to said block and adapted to hold tire casings of different sizes in spread condition over said block, substantially as described.

12. In an appliance of the character described, the combination of a form block shaped substantially to conform to the exterior surface of a portion of a tire casing when disposed inside out, and means adapted to hold such tire casing in spread condition over the block, substantially as described.

13. A tire-repairing device comprising a base, a supporting block on said base and having an arcuate shape curved surface adapted to engage a tire shoe to dispose the inner face thereof outwardly, and means for securing the casing or shoe to the base, substantially as described.

IRA A. WEAVER.
ROLLA G. STOEHR.